United States Patent [19]

Sato et al.

[11] Patent Number: 5,753,727
[45] Date of Patent: May 19, 1998

[54] CHLOROPRENE RUBBER ADHESIVE WITH CHLORINATED POLYOLEFIN AND EPOXY RESIN

[75] Inventors: Shinichi Sato, Urawa; Kunihiro Onishi, Kounosu; Kazuya Fujimoto, Tokyo, all of Japan

[73] Assignee: Konishi Co., Ltd., Osaka, Japan

[21] Appl. No.: 617,261

[22] Filed: Mar. 18, 1996

[30] Foreign Application Priority Data

Mar. 20, 1995 [JP] Japan ............................ 7-060931

[51] Int. Cl.$^6$ .......................... C08K 5/01; C08L 11/00; C08L 63/02
[52] U.S. Cl. ............................... 523/438; 525/108
[58] Field of Search ...................... 525/108; 523/438

[56] References Cited

U.S. PATENT DOCUMENTS

| | | | |
|---|---|---|---|
| 3,542,639 | 11/1970 | Manino | 161/186 |
| 3,878,134 | 4/1975 | Ozelli et al. | 525/108 |
| 4,287,106 | 9/1981 | Forgo et al. | 525/256 |
| 4,342,843 | 8/1982 | Perlinski et al. | 525/113 |
| 5,310,796 | 5/1994 | Warren et al. | 525/129 |

FOREIGN PATENT DOCUMENTS

| | | |
|---|---|---|
| 54-153832 | 12/1979 | Japan . |
| 55-102644 | 8/1980 | Japan . |
| 3-14888 | 1/1991 | Japan . |
| 4-189886 | 7/1992 | Japan . |

OTHER PUBLICATIONS

CAPLUS accession No. 1986:51545 for Japanese Patent No. 60-144315, Hitachi Cable, Ltd., Jul. 1985.
CAPLUS accession No. 1989:596667 for French Patent No. 2,617,494, Landry Plastiques, S.A., Jan. 1989.
WPAT accession No. 80-04307C/03 for Japanese Patent No. 54-153832, Osaka Soda KK., Dec. 1979.
WPAT accession No. 86-172711/27 for Japanese Patent No. 61-4842, Honda Motor Ind KK., May 1986.
WPAT accession No. 95-019479/03 for Japanese Patent No. 63-063341, Sunstar Giken KK., Nov. 1994.

*Primary Examiner*—Robert E. Sellers
*Attorney, Agent, or Firm*—Thomas, Kayden, Horstemeyer & Risley

[57] ABSTRACT

Disclosed is a chloropren rubber adhesive composition. The adhesive composition contains a chloroprene rubber; a tackifier resin; a chlorinated polyolefin; a solvent; and a component which is selected from the group consisting of components (A) and (B). The component (A) is combination of an epoxy resin and a curing agent, and the curing agent is selected from dicyandiamide, imidazole, imidazole derivative, onium compound, ketimine compound represented by the formula (I) or a ketimine derivative. The component (B) is a silane compound having at least two reactive groups, and the reactive group is selected from an epoxy group, a vinyl group, a hydroxy group, an acryloxy group, a methacryloxy group and alkoxy groups.

14 Claims, No Drawings

CHLOROPRENE RUBBER ADHESIVE WITH CHLORINATED POLYOLEFIN AND EPOXY RESIN

BACKGROUND OF THE INVENTION

1. Field of the Invention

The present invention relates to a chloroprene rubber adhesive composition. More particularly, the present invention relates to an adhesive composition having the good adhering properties to an adherent difficult to be adhered such as polyolefins, in particular, polypropylene, and having the heat resistance.

2. Description of the Prior Art

When a chloroprene rubber is used as an adhesive, it exhibits the excellent initial adhesive strength due to fast crystallization, and also manifests the excellent adhesive properties to various adherents. Therefore, it is used for a variety of adhesive uses, and a number of chloroprene adhesives have been developed.

Although the chloroprene adhesive has a variety of uses, it hardly adheres the materials having small polarizability such as polyolefins which have no polar groups on their surface. However, the polyolefin materials such as polyethylene, polypropylene and the like are used for various molded products such as insulating materials and haberdasheries due to water resistance and chemical resistance as well as toughness. In particular, polypropylene has the wide industrial use due to excellent appearances and the like. Therefore, it would be inconvenient if such useful polyolefins can not be adhered because of restricted steps for manufacturing products. For that reason, there is proposed an adhering method by improving the surface of a polyolefin adherent, using a primer or the like, so as to impart the adherability thereto. However, it is desirable to directly adhere the polyolefin materials using an adhesive and, therefore, many attempts have been made to further improve a chloroprene adhesive having a variety of uses.

For example, there are proposed a chloroprene rubber adhesive modified with aminosilane which is disclosed in Japanese Laid-Open Patent Application of KOKAI No.(JP-A) 1-301776 and an adhesive containing a condensate obtained by condensing chloroprene rubber and chlorinated polypropylene with aminoalkylalkoxysilane which is disclosed in Japanese Laid-Opn Patent Application of KOKAI No.(JP-A) 6-306341. In addition, there is proposed an adhesive utilizing modified chloroprene obtained by modifying carboxy-group-containing chloroprene with epoxysilane in Japanese Laid-Open Patent Application of KOKAI No.(JP-A) 4-309586.

However, the adhesives disclosed in the publication documents of No. 1-301776 and No. 4-309586 have the insufficient adhesive strength to polypropylene. On the other hand, the adhesive disclosed in the publication document of Japanese KOKAI No. 6-306341 tried to improve the adhesive strength and heat resistance. However, this adhesive requires a step of heating it with a solvent upon preparation. Therefore, from a viewpoint of working step, there is a demand for an adhesive which can be prepared by more safe step.

SUMMARY OF THE INVENTION

The present invention has been accomplished in view of the above-described circumstances.

With the above problems in mind, therefore, it is an object of the present invention to provide a novel adhesive composition which has the excellent adhesive strenght to polyolefins, which has heat resistance, which can be easily prepared and which has general-purpose properties.

In order to achieve the above-mentioned object, an adhesive composition according to the present invention comprises: a chloroprene rubber; a tackifier resin; a chlorinated polyolefin; an organic solvent; and a component which is selected from the group consisting of (A) combination of an epoxy resin and a curing agent, the curing agent being selected from the group consisting of dicyandiamide, imidazole, imidazole derivatives, onium compounds, ketimine compounds represented by the formula (I) and derivatives of the ketimine compound with a compound having an ethylene oxide group,

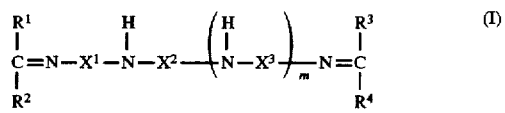

wherein $R^1$, $R^2$, $R^3$ and $R^4$ are the same or different and are selected respectively from the group consisting of alkyl groups having 1 to 6 carbon atoms, a phenyl group and phenyl groups substituted with alkyl group having 1 to 6 carbon atoms, $X^1$, $X^2$ and $X^3$ are the same or different and are respectively an alkylene group having 2 to 6 carbon atoms, and m is 0 or 1, and (B) a silane compound having at least two reactive groups, the reactive group being selected from the group consisting of an epoxy group, a vinyl group, a hydroxy group, an acryloxy group, a methacryloxy group and alkoxy groups.

In accordance with the above construction, the adhesive composition of the present invention has the excellent adhesive properties to polyolefin materials, and it is quite available in the industrial field. In addition, since the present adhesive composition has the heat resistance, the adhesive composition is useful.

The features and advantages of the adhesive composition according to the present invention over the conventional adhesive materials will be more clearly understood from the following description of the preferred embodiments of the present invention.

DETAILED DESCRIPTION OF THE PREFERRED EMBODIMENTS

The inventors of the present invention have found, as the result of various researches, that heat resistance of a chloroprene adhesive can be improved without losing the adhesive properties to polyolefins by selecting a curing agent.

Now, preferred embodiments of the chloroprene adhesive according to the present invention will be described.

Polyolefin materials such as polypropylene and the like have small polarizability. Therefore, these materials are extremely difficult to be adhered. In the present invention, for making an adhesive composition containing chloroprene rubber as a main ingredient to effectively act on adherents made of the material which is difficult to be adhered, a tackifier resin, a chlorinated polyolefin and an organic solvent are incorporated in the the adhesive composition. Further, an ingredient for improving the heat resistance is incorporated therein.

The ingredient for improving the heat resistance includes many embodiments, and the are classified into two types, one of which is (A) a combination of an epoxy resin and a curing agent and the other of which is (B) a silane compound having a functional group and a hydrolyzable alkoxy group.

The curing agent in the combination (A) acts on the epoxy resin as a potential curing agent and includes a plurality of examples which are further classified into (1) a heat-curing agent which cures with heat and (2) a moisture-curing agent which curses with moisture. The potential curing agent is not cured only in the presence of the epoxy resin, which is different from the normal curing agent, therefore the adhesive composition retains the storage stability when the potential curing agent can be incorporated therein together with the epoxy resin. In other words, it is possible to produce an one-pack type adhesive with employment of the combination (A) for the ingredient for improving the heat resistance.

Specific examples of the heat-curing agent (1) includes dicyandiamide, imidazole compound and onium compound, and either one of which can be introduced in a chloroprene adhesive in combination with the epoxy resin to improve the heat resistance of the adhesive composition.

The moisture-curing agent (2) is selected from ketimine compounds (I) having the following structure and derivatives thereof. The ketimine derivatives are obtained by reacting imino group of the ketimine compounds (I) with a compound having an ethylene oxide group.

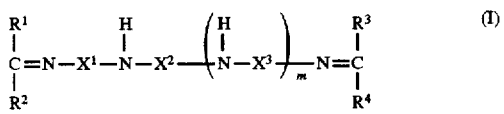

wherein $R^1$, $R^2$, $R^3$ and $R^4$ are the same or different and are selected respectively from the group consisting of alkyl groups having 1 to 6 carbon atoms, a phenyl group and phenyl groups substituted with alkyl group having 1 to 6 carbon atoms, $X^1$, $X^2$ and $X^3$ are the same or different and are respectively an alkylene group having 2 to 6 carbon atoms, and m is 0 or 1.

By addition of the ketimine compound (I) or the derivative, the chloroprene adhesive is improved in the heat resistance. In particular, the ketimine derivative is preferably used since it improves the storage stability more effectively than the ketimine compound (I).

The silane compound (B) used in the present invention has two or more cross-linkable reactive groups. Addition of the silane compound (B), proceeds the cross-linking reaction in the chloroprene adhesive, which imparts the heat resistance to the adhesive composition without losing the adhesive properties. In particular, the use of the silane compound together with the combination (A) can remarkably improve the heat resistance of the adhesive composition.

When the silane compound (B) and the chlorinated polyolefin are present together, the adhesive composition manifests the excellent adhesive properties to the polyolefin adherents. In other words, if the chlorinated polyolefin is absent, the adhesive composition can be hardly used for adhering polyolefins.

Specific examples of the respective ingredients in the chloroprene adhesive composition and suitable contents thereof are described in detail below.

Among the examples of the tackifier resin included are petroleum resin, alkylphenol resin, phenylphenol resin, coumarone-indene resin, terpene-modified phenol resin, rosin-modified phenol resin, rosin resin, an alkylphenol resin mixed with a metal oxide, and the like. The tackifier resin is appropriately used at an amount of 5 to 100 parts by weight, preferably 20 to 80 parts by weight relative to 100 parts by weight of the chloroprene rubber. When the amount of the tackifier exceeds 20 parts by weight, the strength at an elevated temperature is improved. However, from a viewpoint of the workability, the amount is desirably not greater than 80 parts by weight.

The chlorinated polyolefin plays a role in improving the adhesive properties to polyolefins. Examples of the chlorinated polyolefin include chlorinated polyethylene, chlorinated polypropylene and the like. The nature of the chlorinated polyolefin varies depending upon the chlorinated rate. For example, chlorinated polyethylene having about 30% of the chlorinated rate is more flexible than polyethylene, and is rubber-like and soluble in a solvent. Then, as the chlorinated rate grows larger, the chlorinated product becomes harder. In the present invention, chlorinated polyolefin with a chlorinated ratio of 10 to 45% is preferably used and incorporated in the adhesive composition at an amount of 0.1 to 30 parts by weight relative to 100 parts by weight of the chloroprene rubber. When the amount exceeds 30 parts by weight, the self-adhesion property which is a characteristic feature of the chloroprene rubber is lost.

Among the examples of the organic solvent included are aromatic solvents such as toluene, xylene and the like; ketone compounds such as acetone, methyl ethyl ketone and the like; aliphatic solvents such as n-pentane, hexane and the like; alicyclic solvents such as cyclohexane and the like; ester solvents such as ethyl acetate, butyl acetate and the like; chlorinated hydrocarbon compounds such as dichloromethane, propane dichloride and the like. An amount of the solvent is selected in view of handling of the adhesive composition. It is of course possible to use a mixture of a plural kinds of solvents.

Among the examples of the epoxy resin included are bisphenol A epoxy resin, bisphenol F epoxy resin, bisphenol AD epoxy resin and hydrogenated epoxy resin of the above, cresol novolak epoxy resin, phenolic novolak epoxy resin, epoxy resin obtained by glycidylating an amine compound, aliphatic or alicyclic epoxy resin, heterocycle-containing epoxy resin, urethane-modified epoxy resin having urethane linkage, modified epoxy resin obtained by partially epoxidizing a rubber such as polybutadiene and NBR, acrylic compound having an oxirane ring such as glycidyl methacrylate, various brominated epoxy resins, siloxane linkage-containing epoxy resin and the like. The epoxy resin as described above is preferably used at an amount of 0.2 to 150 parts by weight relative to 100 parts by weight of the chloroprene rubber. When the amount is 10 parts by weight or more, tacky-adhesive properties are manifested in the adhesive composition. However, if the amount of the epoxy resin exceeds 150 parts by weight, the adhesive properties to polyolefins of the resulting adhesive composition is reduced.

As the imidazole compound of the heat-curing agent (1), imidazole and various imidazole derivatives having a substituent can be used. Among the examples of imidazole derivatives included are the substituted imidazoles in which the carbon atom at 2, 4 or 5 position is connected with a group selected from alkyl groups such as a methyl group, an ethyl group, an undecyl group, a heptadecyl and the like, a phenyl group, a hydroxyalkyl group, a cyanoalkoxymethyl group; the substituted imidazoles in which the carbon atom at 1 or 3 position is connected with a group selected from a dodecyl group, a benzyl group, a cyanoethyl group, a 2-(2,4-diamino-6-triazinyl)ethyl group and the like; the trimellitic acid salts of the foregoing; and the isocyanuric acid salts of the foregoing.

For the onium compound, an ammonium compound, a phosphonium compound and a sulfonium compound can be utilized. Among them, the sulfonium compound is preferable. For examples of the sulfonium compound, hexafluoroantimonate, hexafluorophosphate and hexafluoroarsenate of a sulfonium which is selected from benzylhydroxyphenylmethyl sulfonium, α- or β-naphthylmethyl-p-hydroxyphenylmethyl sulfonium and benzyltetramethylene sulfonium; sulfonium compounds obtained by substituting the benzyl group or the hydroxyphenyl group of the foregoing sulfonium compounds with nitro group, hydroxy group or halogen group; and sulfonium compounds obtained by alkoxylating or acetoxylating the hydroxyphenyl group of foregoing sulfonium compounds are given.

The above heat-curing agent (1) is preferably used at an amount of 0.1 to 10 parts by weight relative to 100 parts by weight of the epoxy resin. If the amount exceeds 10 parts by weight, the reaction proceeds rapidly and, therefore, sufficient working time is not obtained.

Among the examples of the ketimine compound (I) of moisture-curing agent (2) included are 2,5,8-triaza-1,8-nonadiene, 2,10-dimethyl-3,6,9-triaza-2,9-undecadiene, 2,10-diphenyl-3,5,9-triaza-2,9-undecadiene, 3,11-dimethyl-4,7,10-triaza-3,10-tridecadiene, 3,11-diethyl-4,7,10-triaza-3,10-tridecadiene, 2,4,12,14-tetramethyl-5,8,11-triaza-4,11-pentadecadiene, 2,4,20,22-tetramethyl-5,12,19-triaza-4,19-trieicosadiene, 2,4,15,17-tetramethyl-5,8,11,14-tetraaza-4,14-octadecadiene and the like. For the compound having an ethylene oxide group which reacts with imino group of the ketimine compound (I) to give a ketimine derivative, styrene oxide, butyl glycidyl ether, allyl glycidyl ether, p-terbutylphenyl glycidyl ether, p-sec-butylphenyl glycidyl ether, m,p-cresyl glycidyl ether, p-cresyl glycidyl ether, vinylcyclohexane dioxide, bersatic acid glycidyl ester, cardanol-modified glycidyl ether, dimer acid glycidyl ester, 1,6-hexanediol diglycidyl ether, resorcinol glycidyl ether, propylene glycol diglycidyl ether, 1,4-butanediol diglycidyl ether, neopentyl glycol diglycidyl ether and the like can be given. In particular, a derivative derived from styrene oxide is preferable. It is also possible to use the ketimine derivative which is obtained by reacting one of two imino groups of the ketimine compound (I) with the compound having ethylene oxide group.

The above moisture-curing agent (2) is preferably used at an amount of 2 to 80 parts by weight relative to 100 parts by weight of the epoxy resin. If the amount exceeds 80 parts by weight, curing reaction is insufficient, with the result that good properties are not obtained.

Among the examples of the reactive group in the above silane compound (B) which proceeds the cross-linking reaction included are functional groups such as an epoxy group, a vinyl group, a hydroxy group, an acryloxy group and methacyloxy group; and hydrolyzable alkoxy groups. For examples of alkoxy group, methoxy group and ethoxy group can be given. Among the examples of the silane compound (B) included are epoxyalkoxysilane such as 3-glycidoxypropyltrimethoxysilane, 2-(3,4-epoxycyclohexyl)ethyltrimethoxysilane and the like; vinylalkoxysilane such as vinyltrimethoxysilane, vinyltriethoxysilane, vinyltris(2-methoxyethoxy)silane and the like; acryloxy- or methacryloxysilane such as 3-acryloxypropyltrimethoxysilane, 3-methacryloxypropyltrimethoxysilane and the like; alkylalkoxysilane such as methyltrimethoxysilane and the like; alkoxysilane such as tetramethoxysilane, tetraethoxysilane and the like; and oligomers thereof. For the oligomers of tetramethoxysilane, MKC Silicate MS51 (trade name) manufactured by Mitsubishi Chemical Corp. of Chiyoda-ku, Tokyo, Japane and the like are commercially available. Alternatively, macromolecular type silane compounds having a reactive group therein may be also used and an example of commercially available one is macromolecular coupling agent MMCA (trade name) manufactured by Nippon Unica K.K. of Chiyoda-ku, Tokyo, Japan. Among the above silane compounds, silane compounds having an epoxy group such as γ-glycidoxypropyl-trimethoxysilane and di-γ-glycidoxypropyl-dimethoxysilane are preferable. The silane compounds (B) are preferably used at an amount of 0.3 to 30 parts by weight relative to 100 parts by weight of the chloroprene rubber. If the amount exceeds 30 parts by weight, the initial heat resistance of the resulting adhesive composition remarkably deteriorates.

In a case where the silane compound (B) is used for the ingredient for improving the heat resistance described above, it is convenient to further add to the chloroprene adhesive a catalyst for promoting hydrolysis of the alkoxysilyl group. Among the examples of the catalyst included are organic tin compounds such as dibutyltin laurate, dioctyltin laurate, tin octionate and the like; organic aluminium compounds; organic titanate compounds and the like. The addition of the catalyst as described above facilitates the initial increase of the adhesive strength. If both of the combination (A) of the moisture-curing agent (2) and the epoxy resin and the silane compound (B) are used, the dehydration proceeds in the adhesive composition by the silane compound.

It is also possible to add a conventional anti-aging agent, an acid scavenger and the like to the above ingredients, as occasion arises. As the acid scavenger, magnesium oxide, zinc oxide and the like can be used. In addition, in order to dry the solvent, various dehydrating agents such as molecular sieve (trade name) manufactured by Union Showa K.K. of Minato-ku, Tokyo, Japan, orthosilicate, anhydrous sodium sulfate, anhydrous gypsum and the like can be used.

It is still possible to replace the curing agent in the combination (A) with a conventional curing agent for the epoxy resin, such as polyamine, polyamide and the like. However, since the conventional curing agent like these can not inhibit the adhesive composition before use from being cured, the adhesive composition must be formulated into a two-pack type in order to isolate the epoxy resin from the curing agent.

The adhesive composition according to the present invention is obtained by mixing the above ingredients in the solvent. However, it is to be noted that, if the ketimine compound (I) is to be utilized, the solvent and other ingredients must be suitably dehydrated before preparation of the adhesive composition, because the ketimine compound (I) easily reacts with water. The dehydration can be also carried out by using the above silane compound (B). Therefore, if both of the ketimine compound or derivative thereof and the silane compound (B) are utilized while the order of mixing is appropriately selected, the effects of the ketimine compound can be efficiently exhibited.

The present adhesive composition can be, of course, used for adhering the materials which are easily adhered such as ABS resin and the like.

The following Examples and Comparative Examples illustrate the present invention in detail.

EXAMPLES (Example 1)

Toluene, acetone, ethyl acetate and n-hexane as a solvent to be used were subjected to pre-dehydration treatment using molecular sieve. The dehydrated solvents were mixed at a ratio shown in Table 1 to give a mixed solvent.

Then, according to a ratio shown in Table 1, magnesium oxide (trade name: Kyowa Magu #150; manufactured by Kyowa Chemical Industry Co., Ltd. of Takamatsu City, Kagawa Pref., Japan) and zinc oxide (manufactured by Seido Chemical Industrial Co., Ltd. of Higashi-ku, Osaka, Japan) as a metal oxide were added to a chloroprene rubber (trade name: Denka Chloroprene M40T; manufactured by Denki Kagaku Kogyo K.K. of Chiyoda-ku, Tokyo, Japan), followed by kneading using an open roll to obtain a rubber compound. The resulting rubber compound, alkylphenol resin (trade name: Phenolite TD773; manufactured by Dainippon Ink & Chemicals, Inc. of Chuo-ku, Tokyo, Japan), and a phenol anti-aging agent were completely dissolved in the above mixed solvent. To this solution were added polymerized rosin resin (trade name: Pensel PH-A; manufactured by Arakawa Chemical Industries, Ltd. of Chu-o-ku, Osaka, Japan), a 20% solution of chlorinated polyolefin (trade name: Super Chron; manufactured by Nippon Paper Industries Co., Ltd. of Chiyoda-ku, Tokyo, Japan) in toluene, bisphenol A type epoxy resin (trade name: Epicoat 828; manufactured by Uka Shell Epoxy Co., Ltd. of Chiyoda-ku, Tokyo, Japan) and an imidazole compound as a potential curing agent (trade name: 2MZ-AZINE; manufactured by Shikoku Chemicals Corp. of Marugame City, Kagawa Pref., Japan), followed by stirring to dissolve, to obtain an adhesive composition.

(Examples 2 to 4 and Comparative Example 1)

In each of the cases, the same procedure as that in Example 1 except that the ingredients and amounts thereof were changed according to Table 1 was repeated to obtain the adhesive composition. In connection with indication of Table 1, as the alicyclic epoxy resin used was ERL4221 (trade name; manufactured by Union Carbide Japan). As the sulfonium salt compound used was San-eido SI-60L (trade name; manufactured by Sanshin Chemical Industry Co., Ltd. of Yamaguchi City, Yamaguchi Pref, Japan). As a ketimine derivative, the product obtained by reacting 1 mole of 2,4,12,14-tetramethyl-5,8,11-triaza-4,11-pentadecadiene and 1 mole of styrene oxide at 150° C. for two hours was used.

[Assessment of creep resistance at elevated temperature]

Using an air spray, each of the adhesive compositions obtained in the above Examples and Comparative Example was coated on a wooden base board at an coating ratio of 150 g/m$^2$, followed by drying at 60° C. for two minutes and left to stand at a room temperature for two minutes. On the other hand, a polyolefin foam (main ingredient: polypropylene; manufactured by Toray Industries, Inc. of Chuo-ku, Tokyo, Japan) was heated to 120° C., overlaid on the adhesive composition on the wooden base board, followed by tight compression for 20 seconds at a pressure of 2 kgf/cm$^2$ to obtain a test strip.

The test strip was then allowed to stand at room temperature for one day, the wooden base boad was fixed while keeping the test strip in the perpendicular direction in the atmosphere of at 80° C., and 100 g of the weight was hung from the lower tip of the polyolefin foam. After keeping this situation for 24 hours, the displacement of polyolefin foam was measured to assess the creep resistance at elevated temperature.

[Estimation of storage stability]

With respect to each of the adhesive compositions of Examples and Comparative Example, the viscosity ($V_0$) of the adhesive composition and the viscosity ($V_1$) after storage at 40° C. for two weeks were measured to calculate a thickening ratio ($V_1/V_0$). The estimation standards were as follows: A (when the thickening ratio is not higher than 2.0) and B (when the ratio is 2.0 to 4.0).

The results of creep resistance under high temperatures and storage stability are shown in Table 1.

TABLE 1

| Ingredient (parts by weight) | Ex. 1 | Ex. 2 | Ex. 3 | Ex. 4 | Com. Ex. 1 |
|---|---|---|---|---|---|
| Solvent | | | | | |
| Toluene | 200 | 200 | 200 | 200 | 200 |
| Acetone | 100 | 100 | 100 | 100 | 100 |
| Ethyl acetat | 100 | 100 | 100 | 100 | 100 |
| n-Hexane | 200 | 200 | 200 | 200 | 200 |
| Chloroprene rubber | 100 | 100 | 100 | 100 | 100 |
| Metal oxide | | | | | |
| Magnesium oxide | 3 | 3 | 3 | 3 | 3 |
| Zinc oxide | 2 | 2 | 2 | 2 | 2 |
| Tackifier resin | | | | | |
| Alkylphenol resin | 50 | 50 | 50 | 50 | 50 |
| Polymerized rosin resin | 10 | — | 10 | 10 | 10 |
| Anti-aging agent | 2 | 2 | 2 | 2 | 2 |
| Chlorinated polyolefin | 5 | 5 | 5 | 5 | 5 |
| Epoxy resin | | | | | |
| Bisphenol A type epoxy resin | 7 | 7 | — | 7 | 7 |
| Alicyclic epoxy resin | — | — | 7 | — | — |
| Potential curing agent | | | | | |
| Imidazole | 0.14 | — | — | — | — |
| Sulfonium salt compound | — | 0.14 | 0.14 | — | — |
| Ketimine derivative | — | — | — | 2.1 | — |
| Storage stability | A | A | A | A | A |
| Creep resistance under high temp. (mm/25 mm) | 6 | 2 | 5 | 6 | 15 |

From the results of Examples 1 to 4 and Comparative Example 1, it is apparent that heat resistance varies depending upon whether a curing agent is present or not. Since these curing agents react with the epoxy resin, the effects by introducing the epoxy resin in combination with these curing agents into an adhesive will be understood. In addition, it is suggested from Example 3 that the epoxy resin can be appropriately selected.

(Examples 5 to 14 and Comparative Example 2)

In each of the cases, the same procedure as that in Example 1 except that the ingredients and amounts thereof were changed according to Table 2 was repeated to obtain an adhesive composition. In connection with indication in Table 2, as the vinyl group-containing silane compound, KBM1003 (trade name, manufactured by Shin-Etsu Chemical Co., Ltd. of Chiyoda-ku, Tokyo, Japan) was used. As the methacryl-group-containing silane compound, KBM503 (trade name; manufactured by Shin-Etsu Chemical Co., Ltd.) was used. As the epoxy-group-containing silane compound, KBM403 (trade name; manufactured by Shin-Etsu Chemical Co., Ltd.) was used. As the macromolecular coupling agents (1) and (2), MAC-2101 and MAC-2301 (trade names; manufactured by Nippon Unika K.K.) were used. As the tin catalyst (a hydrolysis promoting agent for the silane compound), No. 2584 (trade name; manufactured by Sankyo Organic Chemicals Co., Ltd. of Takatu-ku, Kawasaki-shi, Kanagawa Pref., Japan) was used.

[Estimation of creep resistance at elevated temperature]

Each of the adhesive compositions obtained in the above Examples 5 to 14 and Comparative Example 2 was coated on a polypropylene base boad at a coating ratio of 150 g/m$^2$ by using an air spray, followed by drying at 60° C. for two minutes and allowed to stand at room temperature for two minutes. On the other hand, a polyolefin foam (main ingredient: polypropylene; manufactured by Toray Industries, Inc.) was heated to 120° C., overlaid on the adhesive composition on the polypropylene base board, followed by tight compression for 10 seconds at a pressure of 0.5 kgf/cm² to obtain a test strip.

The test strip was allowed to stand at room temperature for three days, the polypropylene base board was fixed while keeping the test strip in the perpendicular direction in the atmosphere of at 80° C., and 200 g of the weight was hung from the lower tip of polyolefin foam. After keeping this situation for 24 hours, the displacement of polyolefin foam was measured to estimate the creep resistance at elevated temperature.

[Estimation of storage stability]

According to the same procedure as in Example 1, the viscosity of the adhesive composition was measure to estimate the storage stability.

The results of estimation of the creep resistance under elavated temperature and storage stability of the adhesive compositions are shown in Table 2.

From the results of Examples 10 and 11, it is understood that the addition of the silane compounds improves the heat resistance. Further, Examples 5 and 7 show that the use of silane compounds together with the ketimine derivative have the extremely higher effects. In addition, in Examples 6, 8 to 10 and 12 and 13, the effects of the catalyst which promotes the hydrolysis of the silane compound are seen.

(Examples 15 to 19 and Comparative Examples 3 to 5)

The procedure of Example 1 except that the ingredients and amounts thereof were changed according to Table 3 was repeated to obtain an adhesive compositions. As the chloroprene rubber containing a carboxyl group, Denka Chloroprene DC12L (trade name; manufactured by Denki Kagakukogyo K.K.) was used.

[Estimation of peel strength]

Each of the adhesive compositions obtained in Examples 15 to 19 and Comparative Examples 3 to 5 was coated on the surface, to be adhered, of a sailcloth having the width of 25 mm to seal it. Moreover, another portion of the adhesive composition was coated on a polypropylene plate having the

TABLE 2

| Ingredient (parts by weight) | Example |  |  |  |  |  |  |  |  |  | Com. Ex. |
|---|---|---|---|---|---|---|---|---|---|---|---|
|  | 5 | 6 | 7 | 8 | 9 | 10 | 11 | 12 | 13 | 14 | 2 |
| Solvent |  |  |  |  |  |  |  |  |  |  |  |
| Toluene | 200 | 200 | 200 | 200 | 200 | 200 | 200 | 200 | 200 | 200 | 200 |
| Acetone | 100 | 100 | 100 | 100 | 100 | 100 | 100 | 100 | 100 | 100 | 100 |
| Ethyl acetate | 100 | 100 | 100 | 100 | 100 | 100 | 100 | 100 | 100 | 100 | 100 |
| n-Hexane | 200 | 200 | 200 | 200 | 200 | 200 | 200 | 200 | 200 | 200 | 200 |
| Chloroprene rubber | 100 | 100 | 100 | 100 | 100 | 100 | 100 | 100 | 100 | 100 | 100 |
| Metal oxide |  |  |  |  |  |  |  |  |  |  |  |
| Magnesium oxide | 3 | 3 | 3 | 3 | 3 | 3 | 3 | 3 | 3 | 3 | 3 |
| Zinc oxide | 2 | 2 | 2 | 2 | 2 | 2 | 2 | 2 | 2 | 2 | 2 |
| Tackifier resin |  |  |  |  |  |  |  |  |  |  |  |
| Alkylphenol resin | 50 | 50 | 50 | 50 | 50 | 50 | 50 | 50 | 50 | 50 | 50 |
| Polymerized rosin resin | 10 | 10 | 10 | 10 | 10 | 10 | 10 | 10 | 10 | 10 | 10 |
| Anti-aging agent | 2 | 2 | 2 | 2 | 2 | 2 | 2 | 2 | 2 | 2 | 2 |
| Chlorinated polyolefin | 5 | 5 | 5 | 5 | 5 | 5 | 5 | 5 | 5 | 5 | 5 |
| Epoxy resin |  |  |  |  |  |  |  |  |  |  |  |
| Bisphenol A type epoxy resin | 3 | 1 | 1 | 1 | 5 | 1 | 1 | 1 | 3 | 3 | 3 |
| Potential curing agent |  |  |  |  |  |  |  |  |  |  |  |
| Ketimine derivative | 0.9 | 0.6 | 0.2 | 1.2 | 0.2 | — | — | 0.6 | 0.9 | 0.9 | — |
| Silane compound |  |  |  |  |  |  |  |  |  |  |  |
| Vinyl-group-containing silane compound | — | 5 | 5 | — | — | — | — | — | — | 0.9 | — |
| Methacryl-group-containing silane compound | — | — | — | 5 | 5 | 5 | — | 5 | 5 | — | — |
| Epoxy-group-containing silane compound | 5 | 10 | 10 | 10 | — | 10 | 10 | 8 | 10 | — | — |
| Macromolecular coupling agent 1 | — | — | — | — | — | — | — | 5 | — | — | — |
| Macromolecular coupling agent 2 | — | — | — | — | — | — | — | — | 5 | — | — |
| Tin catalyst | — | 0.2 | — | 0.2 | 0.2 | 0.2 | — | 0.2 | 0.2 | — | — |
| Storage stability | A | A | A | A | A | A | B | A | A | A | A |
| Creep resistance at elevated temperature (mm/25 mm) | 3 | 0.5 | 2 | 0 | 8 | 4 | 6 | 1 | 1.5 | 18 | >50 | width of 25 mm and on the sealed sailcloth, respectively, at a coating ratio of 150 g/m² using an air spray, followed by drying at 60° C. for two minutes to allow to stand at room temperature for 15 minutes. Thereafter, both adherents were laminated and the sufficient pressure was applied thereto using a hand roller. Further, the laminated adherents were cured at room temperature for three days, followed by heating at 120° C. for 30 minutes to obtain a test sample of PP/sailcloth.

Likewise, another portion of the adhesive composition was coated on a sailcloth, having the width of 25 mm, presealed with the adhesive composition and on a mild steel sheet, respectively, to obtain a test sample of mild steel sheet/sailcloth.

Peel strength was measured on each of the resulting test samples at a tensile rate of 200 mm/min.

[Estimation of storage stability]

According to the same manner as that in Example 1, the viscosity of the adhesive composition was measured to estimate the storage stability.

The results of the adhesive strength and storage stability on each adhesive composition are shown in Table 3.

TABLE 3

| Ingredient (parts by weight) | Ex. 15 | Ex. 16 | Ex. 17 | Com. Ex. 3 | Com. Ex. 4 | Com. Ex. 5 |
|---|---|---|---|---|---|---|
| Solvent | | | | | | |
| Toluene | 200 | 200 | 200 | 200 | 200 | 200 |
| Acetone | 100 | 100 | 100 | 100 | 100 | 100 |
| Ethyl acetate | 100 | 100 | 100 | 100 | 100 | 100 |
| n-Hexane | 200 | 200 | 200 | 200 | 200 | 200 |
| Chloroprene rubber | 50 | 50 | 50 | 50 | 50 | 50 |
| Carboxy-group-containing chloroprene rubber | 50 | 50 | 50 | 50 | 50 | 50 |
| Metal oxide | | | | | | |
| Magnesium oxide | 3 | 3 | 3 | 3 | 3 | 3 |
| Zinc oxide | 2 | 2 | 2 | 2 | 2 | 2 |
| Tackifier resin | | | | | | |
| Alkylphenol resin | 50 | 50 | 50 | 50 | 50 | 50 |
| Polymerized rosin resin | 10 | 10 | 10 | 10 | 10 | 10 |
| Anti-aging agent | 2 | 2 | 2 | 2 | 2 | 2 |
| Chlorinated polyolefin | 5 | 5 | 5 | — | — | — |
| Epoxy resin | | | | | | |
| Bisphenol A type epoxy resin | 150 | 50 | 1 | 150 | 1 | 1 |
| Potential curing agent | | | | | | |
| Ketimine derivative | 45 | — | 0.3 | 45 | 0.3 | — |
| Sulfonium salt compound | — | 1 | — | — | — | — |
| Silane compound | | | | | | |
| Methacryl-group-containing Silane compound | 5 | 5 | 5 | 5 | 5 | — |
| Epoxy-Group-containing Silane compound | 10 | 10 | 10 | 10 | 10 | 10 |
| Tin catalyst | 0.2 | 0.2 | 0.2 | 0.2 | 0.2 | — |
| Storage stability | B | B | A | A | A | B |
| Peel strength (N/25 mm) | | | | | | |
| PP/sailcloth | 28 | 43 | 46 | 5 | 7 | 6 |
| mild steel sheet/ sailcloth | 43 | 48 | 48 | 40 | 41 | 42 |

From the results of Comparative Examples 3 to 5, it is understood that, in the present adhesive composition, the addition of chlorinated polyolefin have the effects on adhesive properties to polypropylene. Comparing them with the results of Examples 15, to 17, the excess addition of the epoxy resin reduces the adhesive properties to polyolefin.

It must be understood that the invention is in no way limited to the above embodiments and that many changes may be brought about therein without departing from the scope of the invention as defined by the appended claims.

What is claimed is:

1. An adhesive composition, comprising:
   a) a chloroprene rubber;
   b) from 5 to 100 parts by weight relative to 100 parts by weight of the chloroprene rubber of a tackifier resin;
   c) from 0.1 to 30 parts by weight relative to 100 parts by weight of the chloroprene rubber of a chlorinated polyolefin;
   d) an organic solvent; and
   e) a curing agent, the curing agent being selected from the group consisting of dicyandiamide, imidazole, imidazole derivative, onium compound, ketimine compound which is represented by the formula (I), and derivatives of ketimine with a compound having an ethylene oxide group,

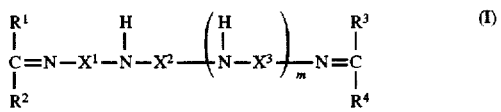

wherein $R^1$, $R^2$, $R^3$ and $R^4$ are the same or different and are selected from the group consisting of alkyl having 1 to 6 carbon atoms, phenyl, and phenyl substituted with alkyl having 1 to 6 carbon atoms. $X^1$, $X^2$ and $X^3$ are the same or different and are alkylene having 2 to 6 carbon atoms, and m is 0 or 1.

2. The adhesive composition as set forth in claim 1, wherein the tackifier resin is selected from the group consisting of petroleum resin, alkylphenol resin, phenylphenol resin, coumarone-indene resin, terpene-modified phenol resin, rosin-modified phenol resin, and rosin resin, and from 0.2 to 150 parts relative to 100 parts by weight of the chloroprene rubber of an epoxy resin combined with.

3. The adhesive composition as set forth in claim 1, wherein the tackifier resin is contained in the adhesive composition at an amount of 20 to 80 parts by weight relative to 100 parts by weight of the chloroprene rubber.

4. The adhesive composition as set forth in claim 1, wherein the chlorinated polyolefin is selected from the group consisting of chlorinated polyethylene and chlorinated polypropylene.

5. The adhesive composition as set forth in claim 1, wherein the chlorinated polyolefin is chlorinated at a ratio of 10 to 45%.

6. The adhesive composition as set forth in claim 1, wherein the organic solvent is selected from the group consisting of aromatic solvents, ketone compounds, aliphatic solvents, alicyclic solvents, ester solvents, and chlorinated hydrocarbon compounds.

7. The adhesive composition as set forth in claim 1, wherein the organic solvent is selected from the group consisting of toluene, xylene, acetone, methyl ethyl ketone, n-pentane, hexane, cyclohexane, ethyl acetate, butyl acetate, dichloromethane, and propane dichloride.

8. The adhesive composition as set forth in claim 1, wherein the epoxy resin is selected from the group consisting of bisphenol A epoxy resin, bisphenol F epoxy resin, bisphenol AD epoxy resin, hydrogenated bisphenol A epoxy resin, hydrogenated bisphenol F epoxy resin, hydrogenated bisphenol AD epoxy resin, cresol novolak epoxy resin, phenolic novolak epoxy resin, epoxy resin of glycidylated amine, aliphatic epoxy resin, alicyclic epoxy resin, heterocycle-containing epoxy resin, urethane-modified epoxy resin, partially epoxidized polybutadiene, partially epoxidized NBR, brominated epoxy resin, and siloxane-linkage-containing epoxy resin.

9. The adhesive composition as set forth in claim 1, wherein the curing agent is a ketimine derivative a compound selected from the group consisting of styrene oxide, butyl glycidyl ether, allyl glycidyl ether, p-ter-butylphenyl glycidyl ether, p-sec-butylphenyl glycidyl ether, m,p-cresyl glycidyl ether, p-cresyl glycidyl ether, vinylcyclohexane dioxide, bersatic glycidyl ester, cardanol-modified glycidyl ether, dimer acid glycidyl ester, 1,6-hexanediol diglycidyl ether, resorcinol glycidyl ether, propylene glycol diglycidyl ether, 1,4-butanediol diglycidyl ethers, and neopentyl glycol diglycidyl ether.

10. The adhesive compound as set forth in claim 9, wherein the curing agent is present at an amount of 2 to 80 parts by weight relative to 100 parts by weight of the epoxy resin.

11. The adhesive composition as set forth in claim 1, further comprising a silane compound having at least two reactive groups, the reactive group being selected from the group consisting of epoxy, vinyl hydroxy, and alkoxy.

12. The adhesive composition as set forth in claim 11, wherein the silane compound is selected from the group consisting of 3-glycidoxypropyltrimethoxysilane, 2-(3,4-epoxycyclohexyl)ethyltrimethoxysilane, vinyltrimethoxysilane, vinyltriethoxysilane, vinyltris(2-methoxyethoxy)silane, 3-acryloxypropyltrimethoxysilane, 3-methacryloxypropyltrimethoxysilane, methyltrimethoxysilane, tetramethoxysilane, and tetraethoxysilane.

13. The adhesive composition as set forth in claim 11, wherein the silane compound is contained in the adhesive composition at an amount of 0.3 to 30 parts by weight relative to 100 parts by weight of the chloroprene rubber.

14. The adhesive composition as set forth in claim 9, wherein the curing agent is present at an amount of 2 to 80 parts by weight relative to 100 parts by weight of the epoxy resin.

* * * * *